United States Patent
Chung et al.

(10) Patent No.: US 11,446,825 B2
(45) Date of Patent: Sep. 20, 2022

(54) METHOD FOR ESTIMATING A DIRECTION OF GRAVITY WITH RESPECT TO A ROBOT

(71) Applicants: Shanghai Flexiv Robotics Technology Co., Ltd., Shanghai (CN); Flexiv Ltd., Grand Cayman (KY)

(72) Inventors: Shuyun Chung, San Jose, CA (US); Xingchi He, Redwood City, CA (US); Kenneth Chao, San Jose, CA (US)

(73) Assignees: SHANGHAI FLEXIV ROBOTICS TECHNOLOGY CO., LTD., Shanghai (CN); FLEXIV LTD., Grand Cayman (KY)

( * ) Notice: Subject to any disclaimer, the term of this patent is extended or adjusted under 35 U.S.C. 154(b) by 231 days.

(21) Appl. No.: 16/849,536

(22) Filed: Apr. 15, 2020

(65) Prior Publication Data

US 2021/0323160 A1 Oct. 21, 2021

(51) Int. Cl.
*B25J 9/16* (2006.01)
*B25J 9/04* (2006.01)
*B25J 17/00* (2006.01)

(52) U.S. Cl.
CPC ............ *B25J 9/1692* (2013.01); *B25J 9/04* (2013.01); *B25J 9/161* (2013.01); *B25J 17/00* (2013.01)

(58) Field of Classification Search
CPC ... B25J 9/1692; B25J 9/04; B25J 9/161; B25J 17/00; B25J 9/1638; G05B 2219/39194
USPC ................................................ 700/245–264
See application file for complete search history.

(56) References Cited

U.S. PATENT DOCUMENTS

| | | | | |
|---|---|---|---|---|
| 4,883,938 A * | 11/1989 | Sarugaku | ................ | B23K 9/12 901/42 |
| 5,355,064 A * | 10/1994 | Yoshino | ............... | B62D 57/032 180/8.1 |
| 5,872,893 A * | 2/1999 | Takenaka | ............. | B62D 57/032 901/1 |
| 6,205,839 B1 * | 3/2001 | Brogårdh | ............. | B25J 19/0041 318/568.22 |
| 9,740,197 B2 * | 8/2017 | Uematsu | ............... | G05B 19/416 |
| 10,145,747 B1 * | 12/2018 | Lin | ........................ | A61B 34/32 |
| 10,800,035 B2 * | 10/2020 | Takamura | ............... | B25J 9/1635 |
| 11,280,690 B2 * | 3/2022 | Lin | ........................ | A61B 34/32 |
| 2016/0132041 A1 * | 5/2016 | Uematsu | ............... | G05B 19/416 318/569 |
| 2018/0272531 A1 * | 9/2018 | Takamura | ............... | B25J 9/1638 |
| 2018/0361580 A1 * | 12/2018 | Takamura | ............... | B25J 9/1638 |
| 2019/0107454 A1 * | 4/2019 | Lin | .................... | A61B 1/00006 |
| 2019/0321990 A1 * | 10/2019 | Naitou | .................. | G01M 1/122 |
| 2020/0030992 A1 * | 1/2020 | Motoyoshi | ............. | B25J 9/1676 |

(Continued)

*Primary Examiner* — Jaime Figueroa
(74) *Attorney, Agent, or Firm* — K&L Gates LLP

(57) ABSTRACT

A method, system, and non-transitory, computer-readable medium are provided for estimating a direction of gravity with respect to a robot. The method includes rotating a first joint. A first torque information of the first joint is recorded during rotation of the first joint. A second joint is then rotated. A second torque information of the second joint is recorded during rotation of the second joint. The direction of gravity is then estimated with respect to the robot based on the first torque information and the second torque information. The method provides an efficient way for determining the direction of gravity with respect to the robot.

20 Claims, 11 Drawing Sheets

(56) References Cited

U.S. PATENT DOCUMENTS

2020/0298417 A1\* 9/2020 Naitou ................... B25J 9/1653
2021/0260756 A1\* 8/2021 Yamamoto ............. B25J 9/1694

\* cited by examiner

METHOD FOR ESTIMATING A DIRECTION OF GRAVITY WITH RESPECT TO A ROBOT

TECHNICAL FIELD

The present disclosure generally relates to robotic technology, and in particular to a method, system, and non-transitory, computer-readable medium for estimating a direction of gravity with respect to a robot.

BACKGROUND

Determining a direction of gravity relative to a robot is important to precise motion control or force control of the robot. If an estimated direction of gravity acquired by the robot deviates from the actual direction of gravity, the estimated gravitational force/torque determined by the robot based on its dynamic model may be inaccurate. An inaccurate determination may lead to an error in motion control of the robot.

Typical methods for determining the direction of gravity relative to a robot include using direct measurements from external sensors, e.g., an inclinometer. A dynamic model of the robot may be utilized to estimate the direction of gravity relative to the robot by using the joint torque difference between the measured value and the value derived from the dynamic model.

SUMMARY

The present disclosure provides a method for estimating a direction of gravity with respect to a robot that can tolerate inaccuracies in linear gain and offset in joint torque measurement without relying on a dynamic model of the robot.

In one aspect, a method for estimating a direction of gravity with respect to a robot is provided. The robot includes multiple joints and links connected successively. The joints include a first joint and a second joint. The first joint is closer to a proximal end of the robot than the second joint. A first joint is rotated. First torque information of the first joint is recorded during rotation of the first joint. A second joint may be rotated. Second torque information of the second joint is recorded during rotation of the second joint. A direction of gravity with respect to the robot may be estimated based on the first torque information and the second torque information.

In another aspect, a robotic system is provided. The robotic system includes a memory in communication with a processor, multiple joints and links. The joints and links are connected successively. The joints include a first joint and a second joint. The first joint is closer to a proximal end of the robot than the second joint. The processor is programmed to rotate the first joint. The processor records first torque information of the first joint is during rotation of the first joint. The processor is also programmed to rotate the second joint. The processor records second torque information of the second joint is during rotation of the second joint. The direction of gravity with respect to the robot is then estimated based on the first torque information and the second torque information.

In yet another aspect, a non-transitory, computer-readable medium is provided that stores instructions which, when executed by a processor, cause the processor to rotate a first joint of a robotic system. The robotic system includes multiple joints and links. The joints and links are connected successively. The joints include a first joint and a second joint. The first joint is closer to a proximal end of the robot than the second joint. The instructions further cause the processor to record first torque information of the first joint during rotation of the first joint. The instructions cause the processor to rotate a second joint. A second torque information of the second joint is recorded during rotation of the second joint. The instructions further cause the processor to estimate a direction of gravity with respect to the robotic system based on the first torque information and the second torque information.

BRIEF DESCRIPTION OF THE DRAWINGS

To more clearly explain the technical solutions in the embodiments of the present disclosure, the drawings used in the description of the embodiments will be briefly described below. The drawings in the following description are merely exemplary embodiments of the present disclosure. For those of ordinary skill in the art, other drawings may also be obtained based on these drawings without any creative work.

DETAILED DESCRIPTION

The disclosure will now be described in detail with reference to the accompanying drawings and examples. As will be apparent to one skilled in the art, the described embodiments in the present disclosure are merely exemplary and represent only a subset of all such embodiments. In particular, all other embodiments obtained by a person of ordinary skill in the art based on the embodiments of the present invention without creative efforts fall within the scope of the present disclosure.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all numbers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Figure 1:
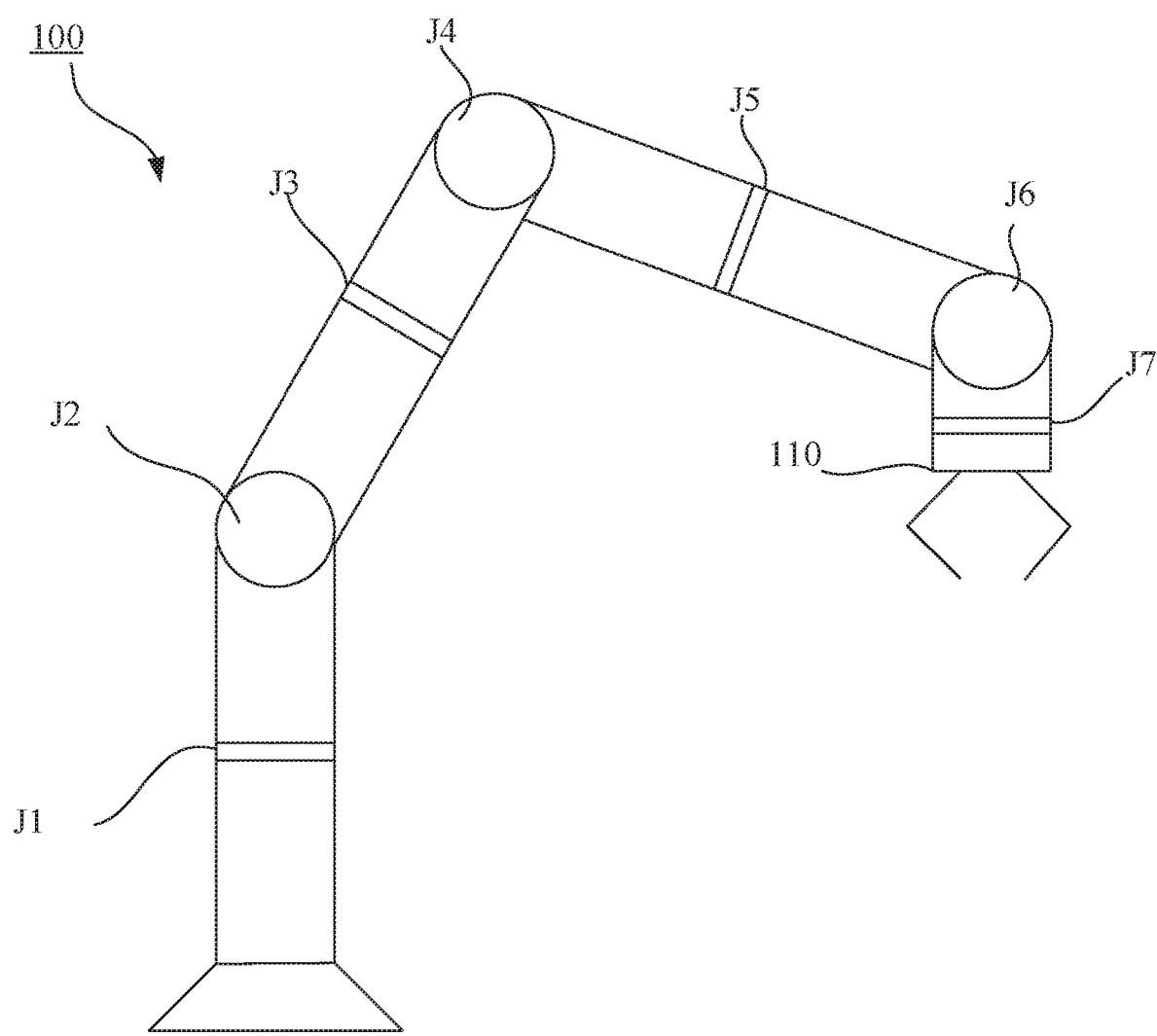
FIG. 1 illustrates a structural diagram of a robotic system according to an embodiment of the present disclosure.

FIG. 1 illustrates a structural diagram of a robotic system 100, e.g., an industrial robot, according to an embodiment of the present disclosure. The robotic system 100 includes multiple joints J1, J2, J3, J4, J5, J6, and J7 (hereinafter, "joints J1-J7") connected successively by multiple links (not labeled). In some embodiments, the robotic system 100 may further include an end effector 110 for achieving certain tasks such as grasping or machining a target object. It should be appreciated that the robotic system 100 may have more or less than the quantity of joints J1-J7 and links illustrated in FIG. 1 in various embodiments. For example, in other embodiments, the robotic system 100 may be an n-axis robot which includes n joints, where n is an integer equal to or larger than two.

The robotic system 100 may further include a memory in communication with a processor (not shown). The memory is configured to store program instructions. The processor is programmed to execute the program instructions so as to control the movement of the robotic system 100. The processor may be implemented as one or more of, e.g., a central processing unit (CPU), other general-purpose processor, digital signal processor (DSP), application specific integrated circuit (ASIC), field-programmable gate array (FPGA), other programmable logic device, discrete gates or transistor logic devices, and/or discrete hardware components. The processor may be a microprocessor or any other conventional processor.

The memory may be an internal storage unit, such as a hard disk.

Alternatively, the memory may be one or more of, e.g., an external storage device, such as plug-in hard disk, smart media card (SMC), secure digital (SD) card, or flash card. In some embodiments, the memory may include both internal and external storage units. The memory may be utilized to store program instructions and other programs and data necessary for operations of the robotic system 100. The memory may also be utilized to temporarily store data which has been sent or will soon be sent.

Those of ordinary skill in the art will appreciate that, in some examples, the memory and/or the processor may be located inside the joints J1-J7 or the links. In other examples, the memory and/or processor may be arranged in a control box of the robotic system 100, separate from the joints J1-J7 and links. In other examples still, the memory and/or the processor may be arranged in an external control device and the processor may communicate commands to the robotic system 100 through a wired or wireless network.

Figure 2:
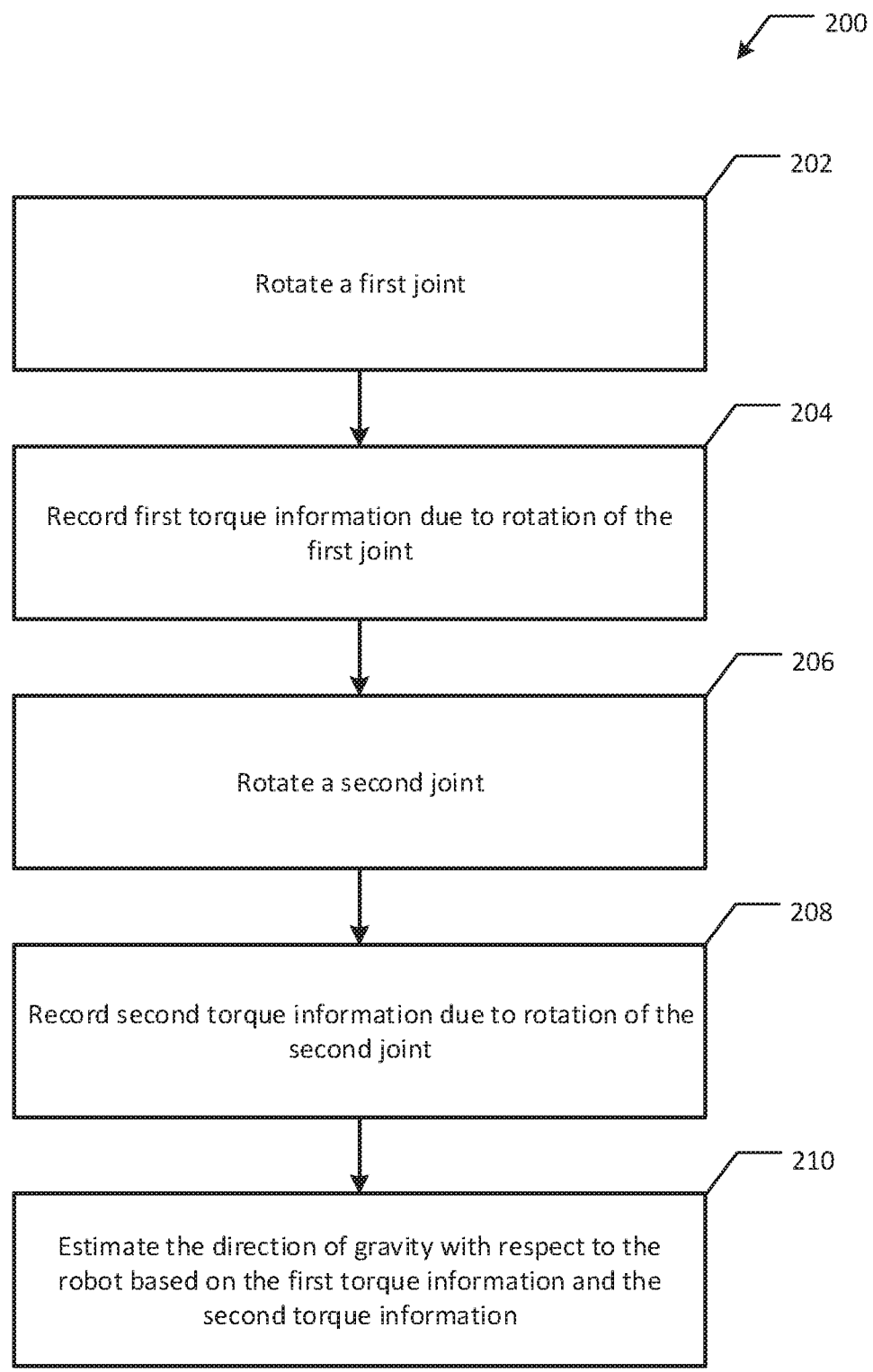
FIG. 2 illustrates a flow chart of a method for estimating gravity direction with respect to a robot according to an embodiment of the present disclosure.

The processor may execute the program instructions stored in the memory to effect a method for estimating a direction of gravity with respect to the robotic system 100. For example, a direction of gravity may be estimated with respect to the rotation axis of one or more joints J1-J7. FIG. 2 illustrates a box diagram of an example method 200 for estimating a direction of gravity with respect to a robot (e.g., the robotic system 100). The method 200 includes using torque information of two revolute joints whose axes are not in parallel (e.g., the joint J1 and J2 as shown in FIG. 1). It should be appreciated that other joints (e.g., joints J3, J4, J5, J6, and/or J7) of the robotic system 100 may additionally or alternatively be rotational or linear actuators.

The example method 200 includes rotating a first joint of a robot (e.g., the robotic system 100) (block 202). The first joint may be any target joint that it is desired to determine a relationship of between a direction of gravity and a rotation axis of the target joint. For example, the first joint may be the joint J1 located at a proximal end of the robotic system 100 as shown in FIG. 1. In various instances, the first joint J1 is the only joint of the robotic system 100 that is rotated at this point. Stated differently, each of the other joints aside from the first joint J1 of the robotic system 100 are locked while the first joint J1 is rotated. The first joint J1 may be rotated by an actuator (e.g., a drive motor), such as an actuator of the first joint J1.

The torque of the first joint J1 due to rotation of the first joint J1 can be measured or estimated, and recorded as a first torque information (block 204). In one example, the torque of the first joint J1 may be measured by a torque sensor of the first joint J1. In another example, the torque of the first joint J1 may be estimated by using other parameters such as the drive current of the drive motor of the first joint J1. In some instances, the torque information of the first joint J1 may be recorded during rotation of the first joint J1. In other instances, the torque information of the first joint J1 may be recorded after, such as shortly or immediately after, rotation of the first joint J1.

The example method 200 then includes rotating a second joint (block 206). The second joint may be any joint of the robotic system 100 whose rotation axis is not parallel to the first joint J1. For example, the second joint may be the joint J2 adjacent to the first joint J1. In various instances, the second joint J2 is the only joint of the robotic system 100 that is rotated at this point. Stated differently, each of the other joints aside from the second joint J2 of the robotic system 100 are locked while the second joint J2 is rotated. The second joint J2 may be rotated by an actuator (e.g., a drive motor), such as an actuator of the second joint J2.

The torque of the second joint J2 due to rotation of the second joint J2 is measured or estimated, and recorded as a second torque information (block 208). In one example, the torque of the second joint J2 may be measured by a torque sensor of the second joint J2. In another example, the torque of the second joint J2 may be estimated by using other parameters such as the drive current of the drive motor of the second joint J2. In some instances, the torque information of the second joint J2 may be recorded during rotation of the second joint J2. In other instances, the torque information of the second joint J2 may be recorded after, such as shortly or immediately after, rotation of the second joint J2.

Figure 3A:
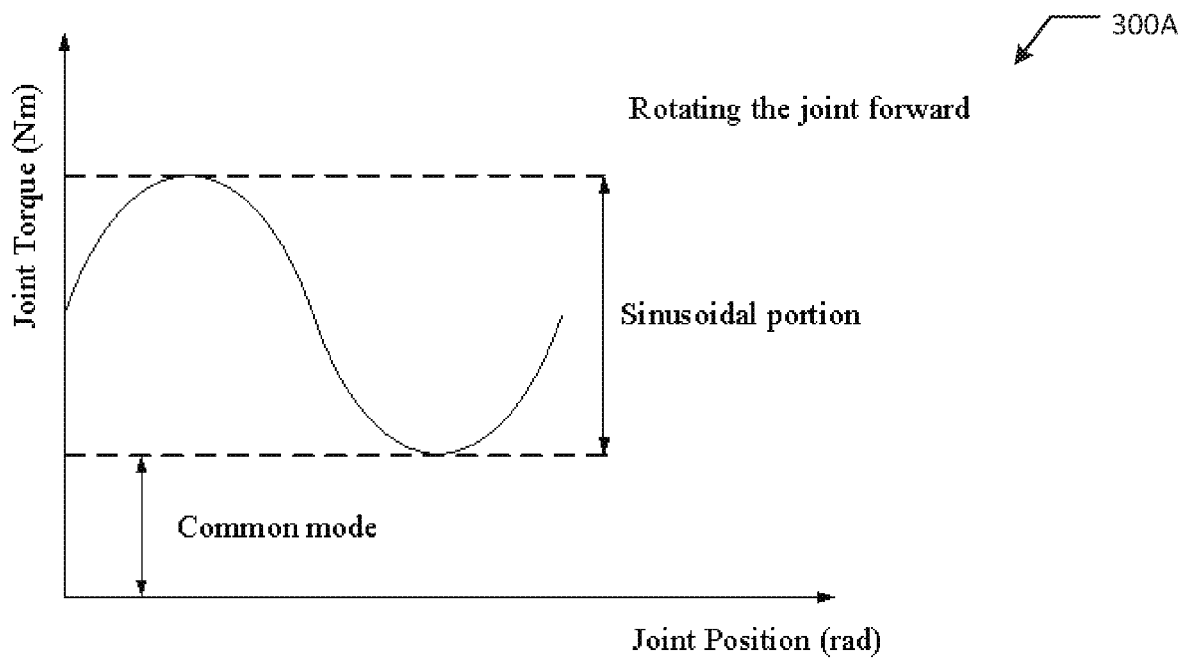
FIG. 3A illustrates a graph of an exemplary joint torque information recorded during rotation of a joint.
Figure 3B:
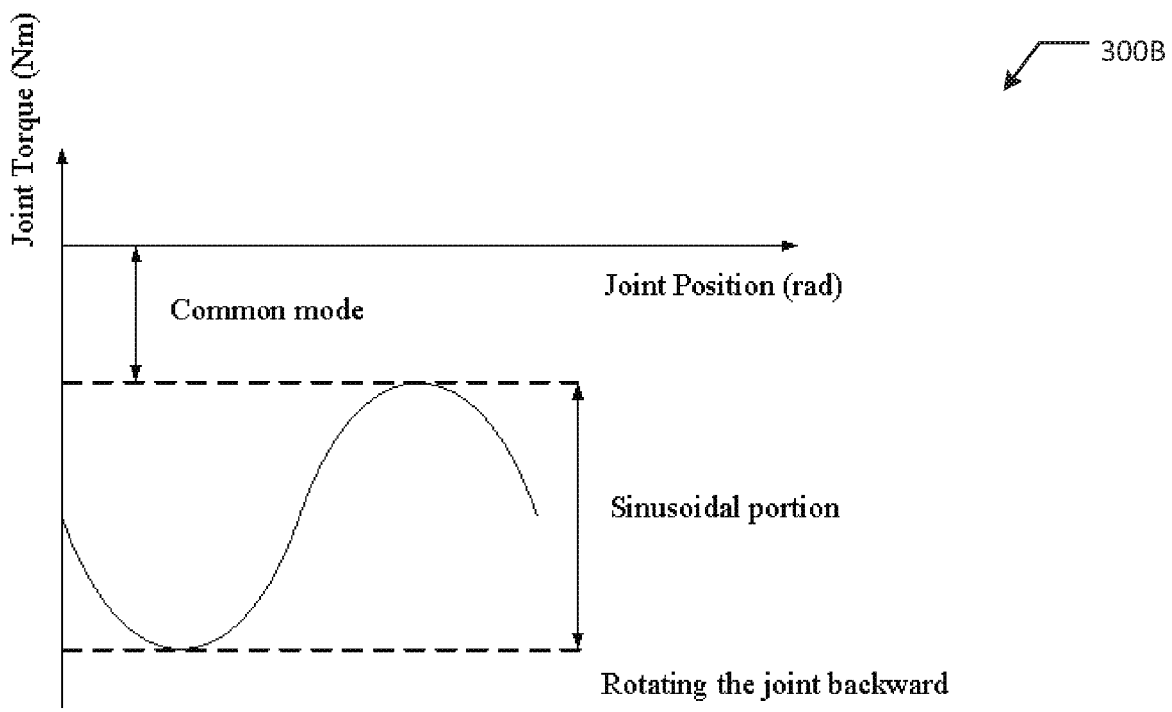
FIG. 3B illustrates a graph of an exemplary joint torque information recorded during rotation, in an opposite direction, of the same joint used in FIG. 3A.

A direction of gravity with respect to the robotic system 100 may then be determined based on the first torque information and the second torque information (block 210). In general, two reference angles (e.g., angular offset) are used to describe the direction of gravity with respect to the robotic system 100, denoted as θ1 and θ2 in the present disclosure (e.g., FIGS. 5, 8, 9, and 11). FIGS. 3A and 3B show exemplary joint torque information recorded during rotation of a joint in different directions. FIG. 3A illustrates a torque curve 300A recorded when the joint is rotated in a first direction. FIG. 3B illustrates a torque curve 300B recorded when the joint is rotated in a direction opposite to the first direction. The joint torque information may show the relation between the joint torque and the position (or rotation angle) of the joint.

As illustrated in FIGS. 3A and 3B, the respective torque curves 300A and 300B, in some instances, may include a sinusoidal portion and a common mode portion. In such instances, the joint axis is not aligned with the gravity direction. Only the sinusoidal portion of the torque curve 300A or 300B represents the torque applied on the joint due to gravity. The provided method may therefore include abstracting (e.g., by curve fitting) the sinusoidal portion of the torque curve 300A or 300B and using the sinusoidal portion for further calculation for determining the direction of gravity.

In some embodiments, the first joint J1 may be rotated forward and backward to cover a first predetermined rotation range at a substantially constant speed. In such embodiments, the common mode of torque recordings (e.g., as shown in FIGS. 3A and 3B) of forward and backward passes can be calculated. The sinusoidal portion of the torque recordings of the first joint J1 can then be acquired. The first predetermined rotation range may be determined based on actual design requirements as long as the torque recordings acquired in the first predetermined rotation range include enough information for describing the features (e.g., sinusoidal amplitude and phase shift) of the sinusoidal portion of the torque curve 300A, 300B. For example, the first predetermined range may be 90°, 120°, 150°, 180° etc. By rotating the first joint forward and backward at a constant speed, the influence of factors (e.g., friction, decentration) other than gravity can be eliminated. For instance, such other factors may contribute to the sinusoidal portion of the torque curve 300A, 300B, and thus must be eliminated so that only gravitational effects are present in the sinusoidal portion.

In some embodiments, the second joint J2 may be rotated forward and backward to cover a second predetermined rotation range at a substantially constant speed. In such embodiments, the common mode of torque recordings of forward and backward passes can be calculated. The sinusoidal portion of the torque recordings of the second joint J2 can then be acquired. The second predetermined range may be determined based on actual design requirements as long as the torque recordings acquired in the second predetermined range include enough information for describing the features (e.g., sinusoidal amplitude and phase shift) of the sinusoidal portion of the torque curve. For example, the second predetermined range may be 90°, 120°, 150°, 180° etc. By rotating the second joint forward and backward at a constant speed, the influence of factors (e.g., friction, decentration) other than gravity can be eliminated.

Figure 4A:
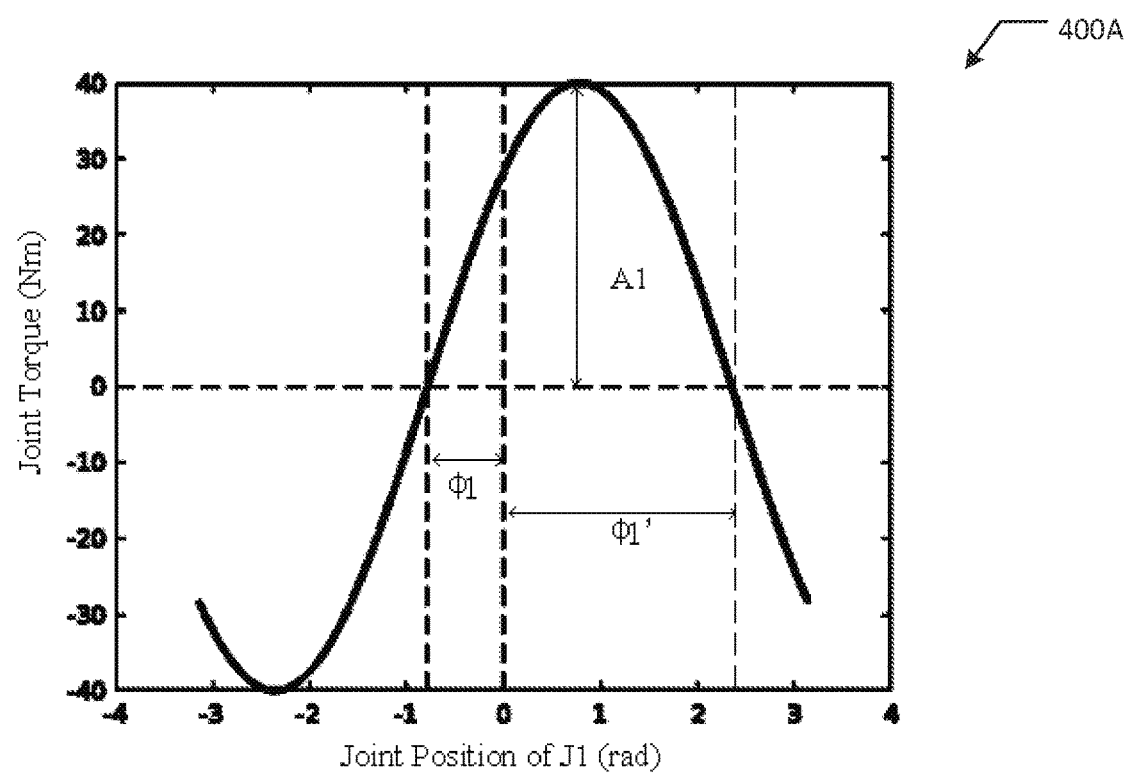
FIG. 4A illustrates a graph of a first torque information of a first joint during rotation of the first joint according to an embodiment of the present disclosure.
Figure 4B:
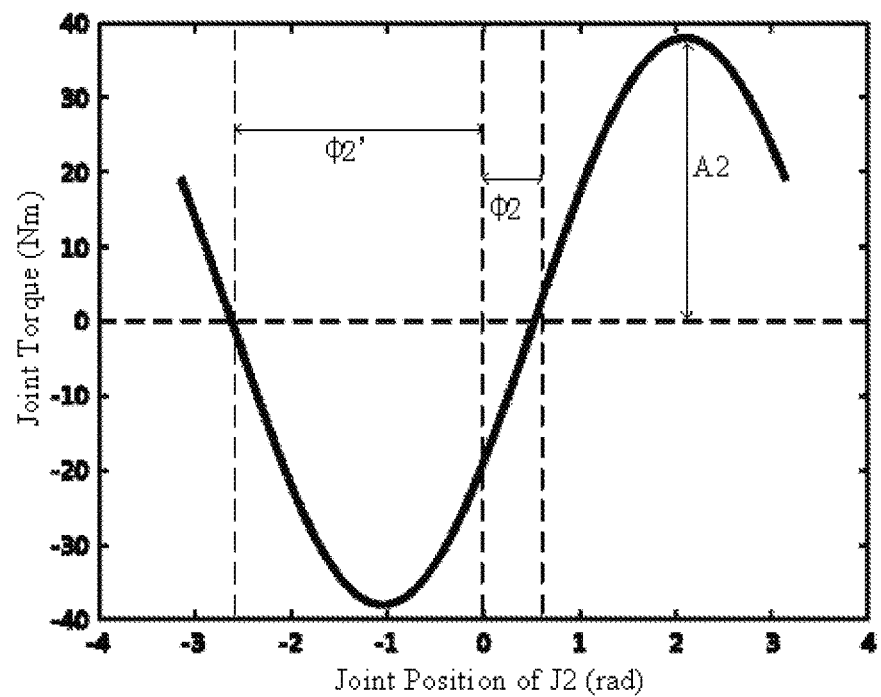
FIG. 4B illustrates a graph of a second torque information of a second joint during rotation of the second joint according to an embodiment of the present disclosure.

FIGS. 4A and 4B respectively illustrate an example of first torque information 400A and second torque information 400B. As illustrated, the first torque information 400A may include a first amplitude A1 and a first phase shift $\varphi_1$ or $\varphi_1'$ of the sinusoidal portion of the torque recordings acquired due to rotating the first joint J1 (e.g., the torque applied on the first joint J1 due to gravity during rotation of the first joint J1). The second torque information may include a second amplitude A2 and a second phase shift $\varphi_2$ or $\varphi_2'$ of the sinusoidal portion of the torque recordings acquired due to rotating the second joint J2 (e.g., the torque applied on the second joint J2 caused by the gravity during rotation of the second joint J2).

In one example, a first reference angle $\theta_1$ may be determined based on a first phase shift $\varphi_1$ or $\varphi_1'$ that is acquired when recording the first torque information due to rotation of the first joint J1. The first reference angle $\theta_1$ corresponds to a specific position of the first joint J1 at which torque applied on the first joint J1 due to gravity is substantially zero.

A second reference angle $\theta_2$ may be determined based on the first torque information and the second torque information. The second reference angle $\theta_2$ is an angle between the direction of gravity and a rotation axis of the first joint J1. The direction of gravity with respect to the rotation axis of the first joint J1 may be expressed based on the first reference angle $\theta_1$ and the second reference angle $\theta_2$. The relationship between the direction of gravity and the first and second reference angles $\theta_1$ and $\theta_2$ can be expressed in various ways in various aspects of the present disclosure.

As illustrated in FIG. 4A, the intersections of the sinusoidal curve and the x-axis are at $\varphi_1$ and $\varphi_1'$. The positions $\varphi_1$ and $\varphi_1'$ are where gravity has zero effect on the joint J1. Thus, the first reference angle $\theta_1$ (e.g., the angular offset with respect to the horizontal axis) may be determined by using Equation 1 below.

$$\theta_1 = -\varphi_1 \text{ or } \theta_1 = 180° - \varphi_1 \tag{1}$$

As described above, the first reference angle $\theta_1$ corresponds to a specific position of the first joint J1 at which the torque applied on the first joint J1 due to gravity is substantially zero. Stated differently, when the first joint J1 is rotated to this specific position $\theta_1$, the point mass m is located in a plane ZOA (FIG. 5) defined by the rotation axis of J1 and the gravity vector (e.g., in the negative Z direction). In some instances, the first joint J1 is rotated to this specific position before a second joint is rotated.

During or subsequent to the second joint J2 being rotated (e.g., with all other joints locked in place), the torque applied on the second joint J2 can be recorded. After removing the friction torque, the sinusoidal portion of joint torque $\tau_2$ can be extracted according to Equation 2 below:

$$\tau_2 = A_2 \sin(q_2 + \varphi_2) \tag{2}$$

where $\tau_2$ corresponds to the torque applied on the second joint J2 caused by gravity;

$A_2$ is the second amplitude;

$q_2$ is a position of the second joint during the rotation of the second joint J2; and $\varphi_2$ is the second phase shift.

Figure 5:
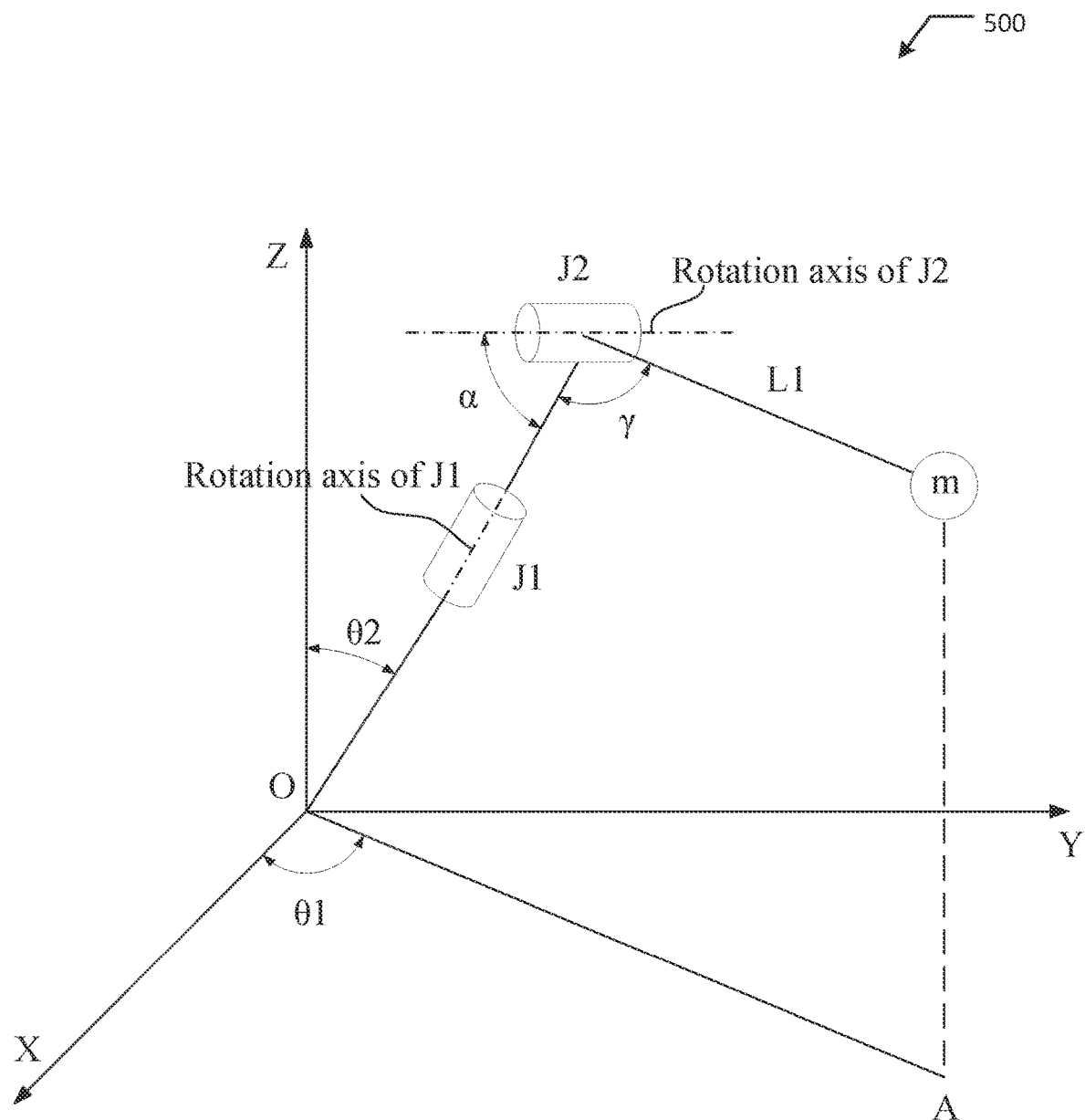
FIG. 5 illustrates a simplified model of a robotic system according to an embodiment of the present disclosure.
Figure 6:
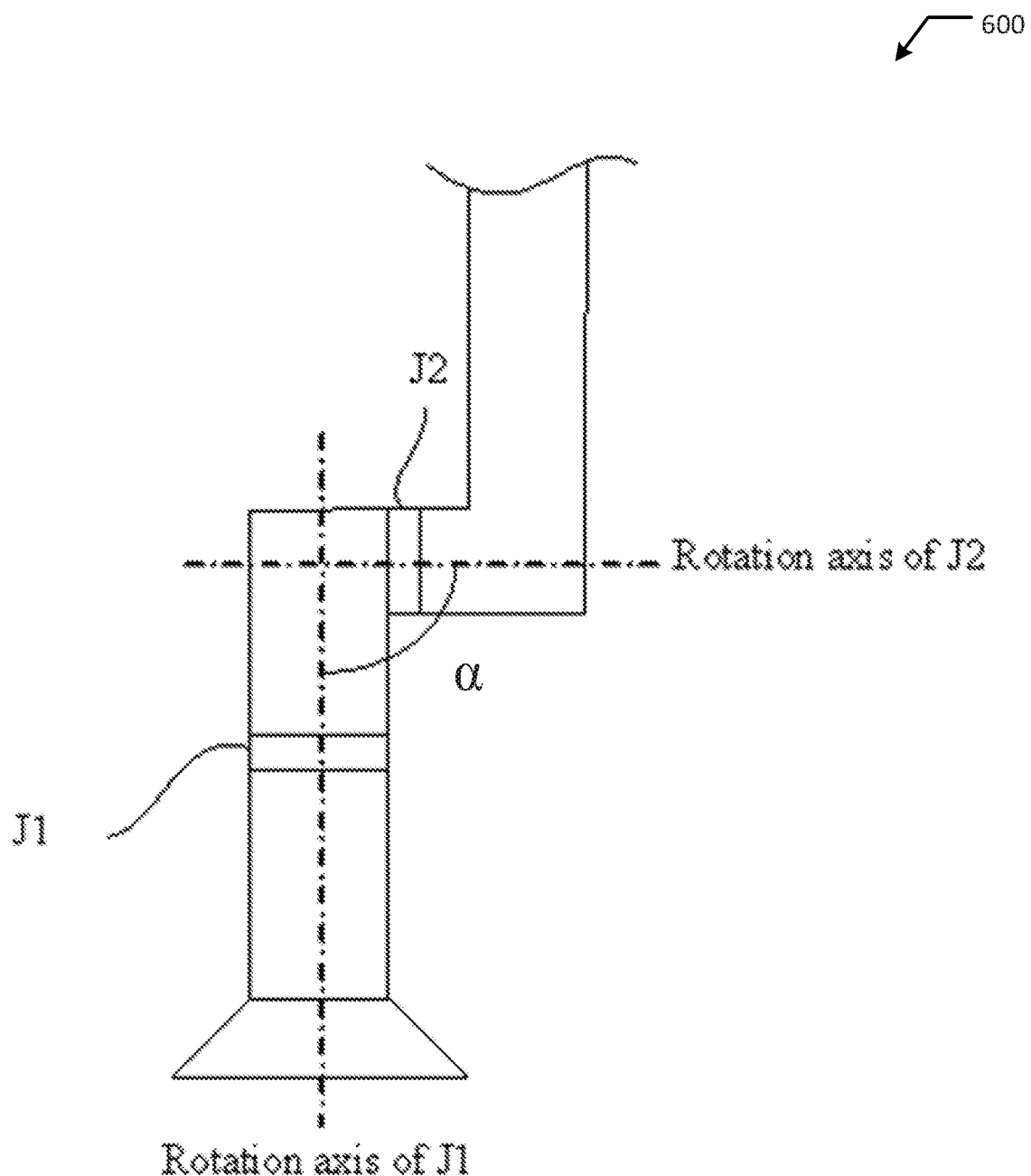
FIG. 6 illustrates a side view of a portion of a robotic system according to an embodiment of the present disclosure.

FIG. 5 illustrates a simplified model 500 of a robotic system according to an embodiment of the present disclosure. The XYZ axes are a global coordinate system in Cartesian space, and gravity is in the negative Z direction. For simplification, it is assumed that all robot mass can be lumped into a point mass m, so all joints and links including J1 and J2 are massless. The angle $\gamma$ is the angle between the rotation axis of J1 and the line connecting J2 to the point mass m, which can be changed by rotating the second joint J2. The angle between rotation axes of J1 and J2 is denoted as $\alpha$, which is known from robot kinematics, and is typically 90° in a serial chain kinematic manipulator. FIG. 6 illustrates a side view of a portion of an example robotic system 600 in which rotation axes of J1 and J2 are substantially perpendicular. With reference to the simplified model 500 of FIG. 5, the second amplitude $A_2$, or the maximum gravity torque on the joint J2 (the joint J1 angular position is equal to $\theta_1$) can be derived according to Equation 3 below.

$$A_2 = mgL_1 \tag{3}$$

Based on the first amplitude A1 and the second amplitude A2, the second reference angle $\theta_2$ can be determined according to Equations 4 and 5 below. The second reference angle θ2 represents the angular offset between the vertical axis (the direction of gravity) and the rotation axis of J1.

$$\frac{A_1}{A_2} = \frac{mgL_1 \sin\theta_2}{mgL_1} = \sin\theta_2 \quad (4)$$

$$\theta_2 = \arcsin\frac{A_1}{A_2} \quad (5)$$

In the above example, the angle γ is equal to 90° during the rotation of the first joint J1. In other examples, the angle γ may be equal to angles other than 90° during the rotation of the first joint J1. The first reference angle θ1 can be determined by using the Equations 6, 7, and 8 below.

$$\tau_1 = A_1' \cdot \sin(q_1 + \varphi_1) \quad (6)$$

$$A_1' = mgL_1|\sin\gamma|\sin\theta_2 \rightarrow A_1 = \frac{A_1'}{|\sin\gamma|} \quad (7)$$

$$\theta_1 = -\varphi_1 \text{ or } \theta_1 = 180° - \varphi_1 \quad (8)$$

The second reference angle θ2 can be determined according to Equations 9, 10, and 11 below.

$$\tau_2 = A_2 \sin(q_2 + \varphi_2) \quad (9)$$

$$A_2 = mgL_1 \quad (10)$$

$$\theta_2 = \arcsin\left(\frac{A_1}{A_2}\right) \quad (11)$$

The above-described example method for determining the direction of gravity with respect to the robotic system 100 is accordingly more reliable and accurate compared with typical methods. For instance, because the value of θ2 is relevant to the ratio of A1 to A2, where A1 and A2 are the amplitudes of sinusoidal portions of the first torque information and the second torque information respectively, the provided method is not sensitive to linear gain, offset error of the torque measurement, nor joint friction on the first and second joints J1 and J2.

Figure 7:
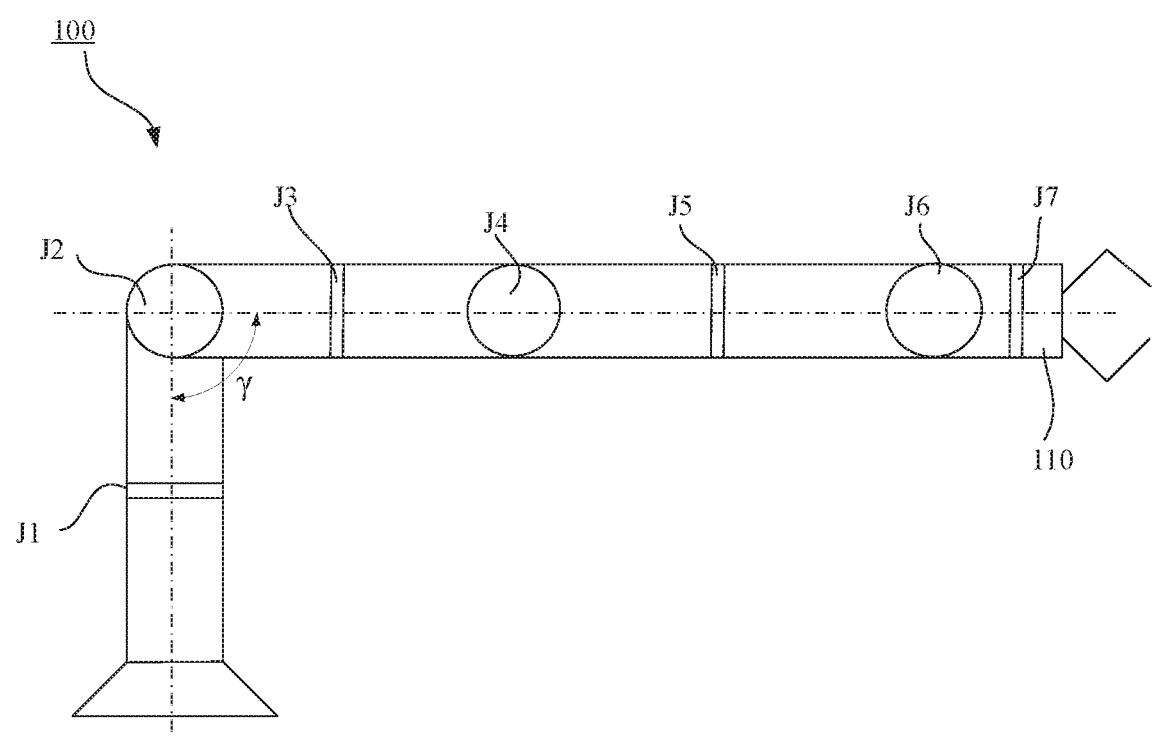
FIG. 7 illustrates a front view of a robotic system presenting one exemplary pose according to an embodiment of the present disclosure.

FIG. 7 illustrates an example configuration of the robotic system 100. As illustrated, in some examples, all of the links connected after the second joint J2 may be aligned such that they extend substantially in a same line. The second joint J2 may be rotated to make the links connected after the second joint J2 extend perpendicular to the link between the first joint J1 and the second joint J2 (e.g., perpendicular to the rotation axis of the first joint J1). In this example, the robotic system 100 is very close to the simplified model 500 illustrated in FIG. 5, and the angle γ is equal to 90° during the rotation of the first joint J1.

The first joint J1 may be rotated while all the other joint positions are fixed. The torque applied on the first joint J1 can be recorded while the first joint J1 is rotated or shortly thereafter. After removing the torque due to friction and other factors, the sinusoidal portion of joint torque $\tau_1$ can be extracted according to Equation 12 below:

$$\tau_1 = A_1 \cdot \sin(q_1 + \varphi_1) \quad (12)$$

where $\tau_1$ corresponds to the torque applied on the first joint J1 caused by gravity;

$A_1$ is the first amplitude;

$q_1$ is the position of the first joint J1 during its rotation; and $\varphi_1$ is the first phase shift.

Assuming the example configuration shown in FIG. 5, the first amplitude $A_1$, or the maximum gravity torque on J1 (with γ is equal to 90°) can be determined according to Equation 13 below:

$$A_1 = mgL_1 \sin\theta_2 \quad (13)$$

where m is the overall system mass;

g is the gravity acceleration;

$L_1$ is the length from J2 to the point mass m;

$\theta_2$ is the angular offset between the gravity direction and the rotation axis of J1 as show in FIG. 5.

It should be appreciated that if the first amplitude A1 is very close to zero, it can be concluded that the gravity direction is almost parallel to the rotation axis of the first joint J1. Therefore, in some instances, a threshold may be pre-defined according to actual application. In such instances, when the first amplitude A1 is less than the pre-defined threshold, the direction of gravity can be acquired directly. Otherwise, the direction of gravity may be determined according to the above-described methods and calculations (e.g., Equations 1 to 11).

Figure 8:
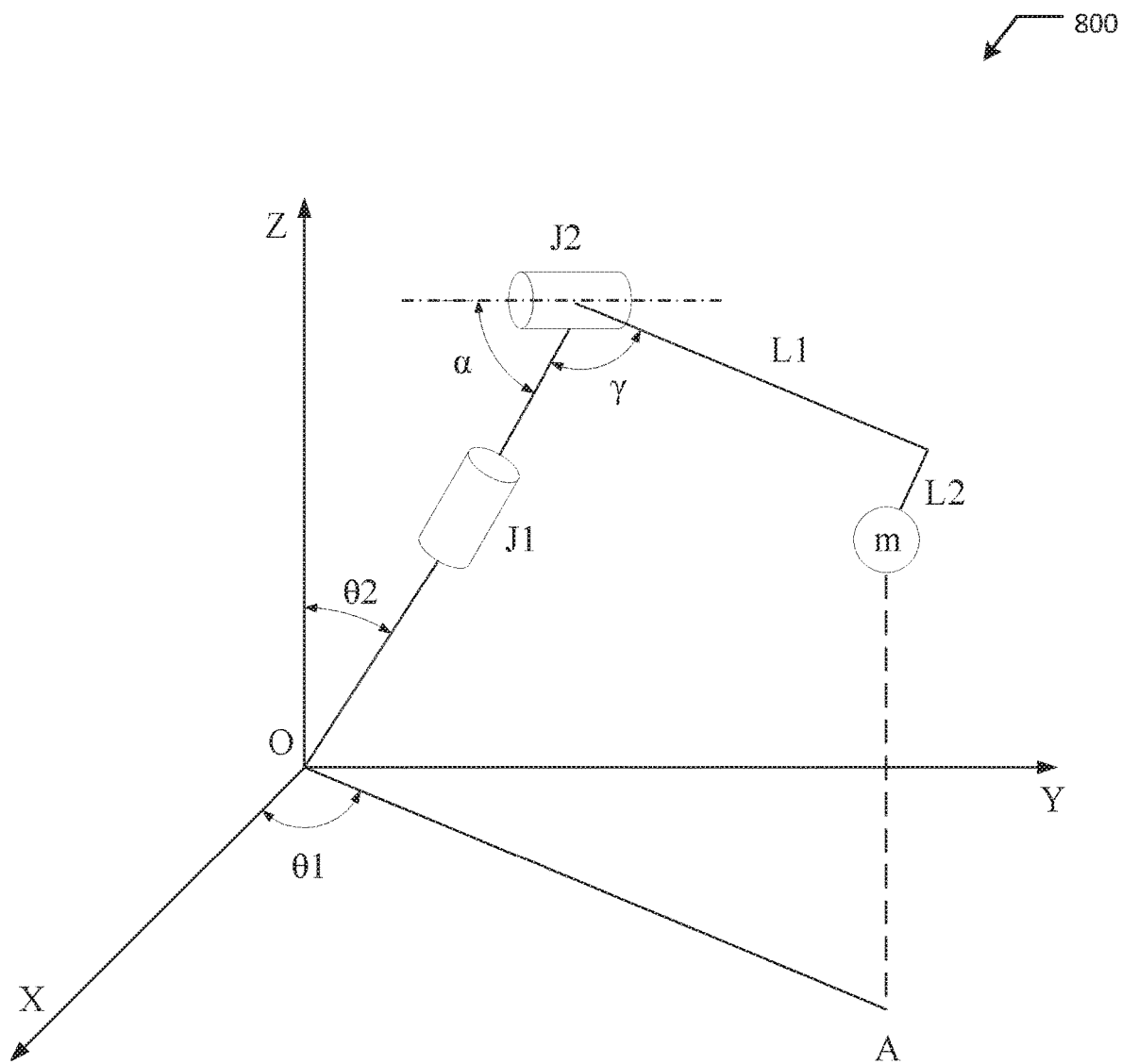
FIG. 8 illustrates a simplified model of a robotic system according to an embodiment of the present disclosure.
Figure 9:
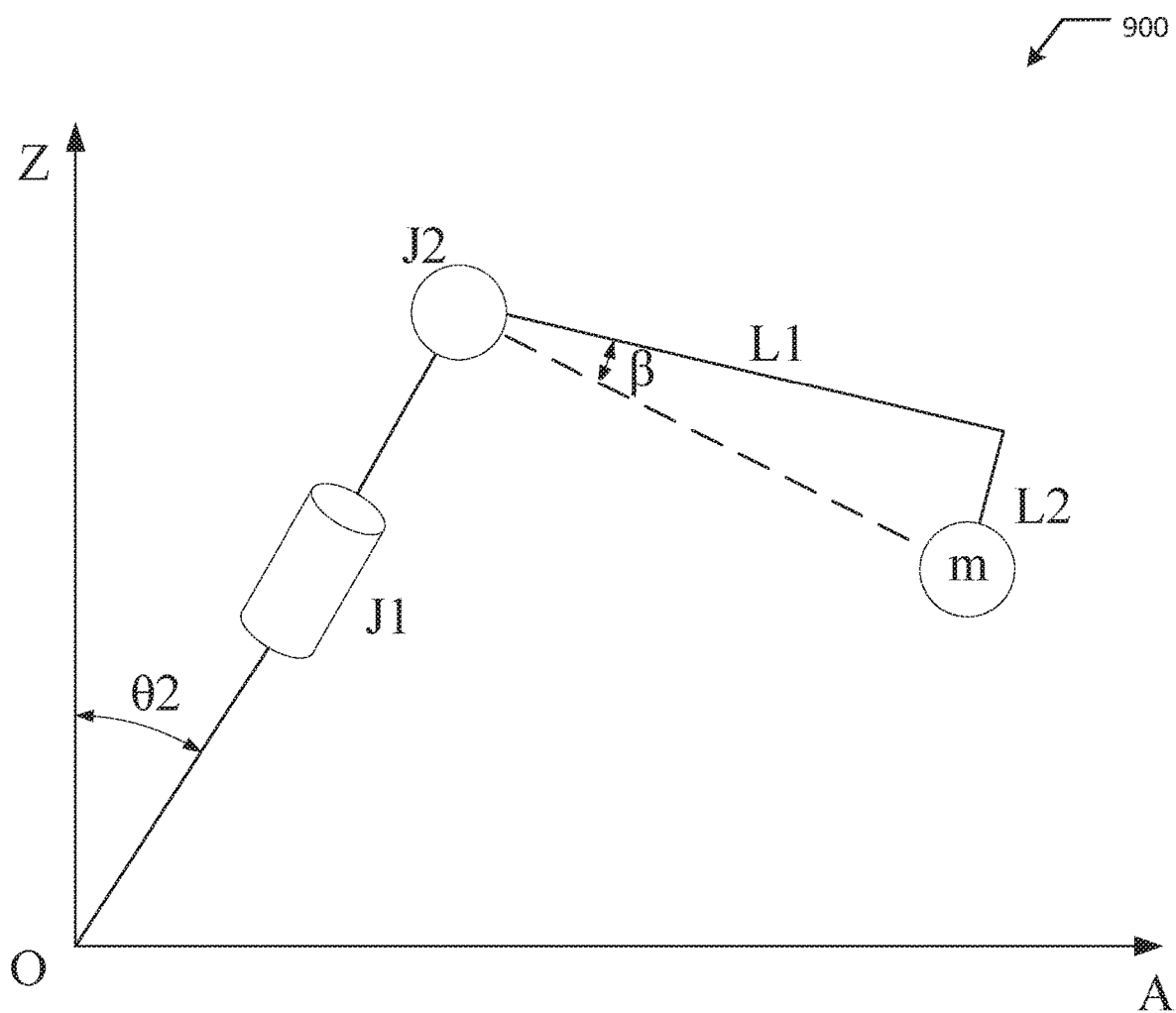
FIG. 9 illustrates an embodiment of the simplified model of FIG. 8 in which the point mass is located in the plane ZOA.

FIGS. 8 and 9 illustrate simplified models 800 and 900, respectively, of a robotic system according to an embodiment of the present disclosure. The XYZ axes are the world coordinate system in Cartesian space, and gravity is in the negative Z direction. It is assumed that all robot mass can be lumped into a point mass m, so that all joints and links including J1 and J2 are massless.

Figure 10:
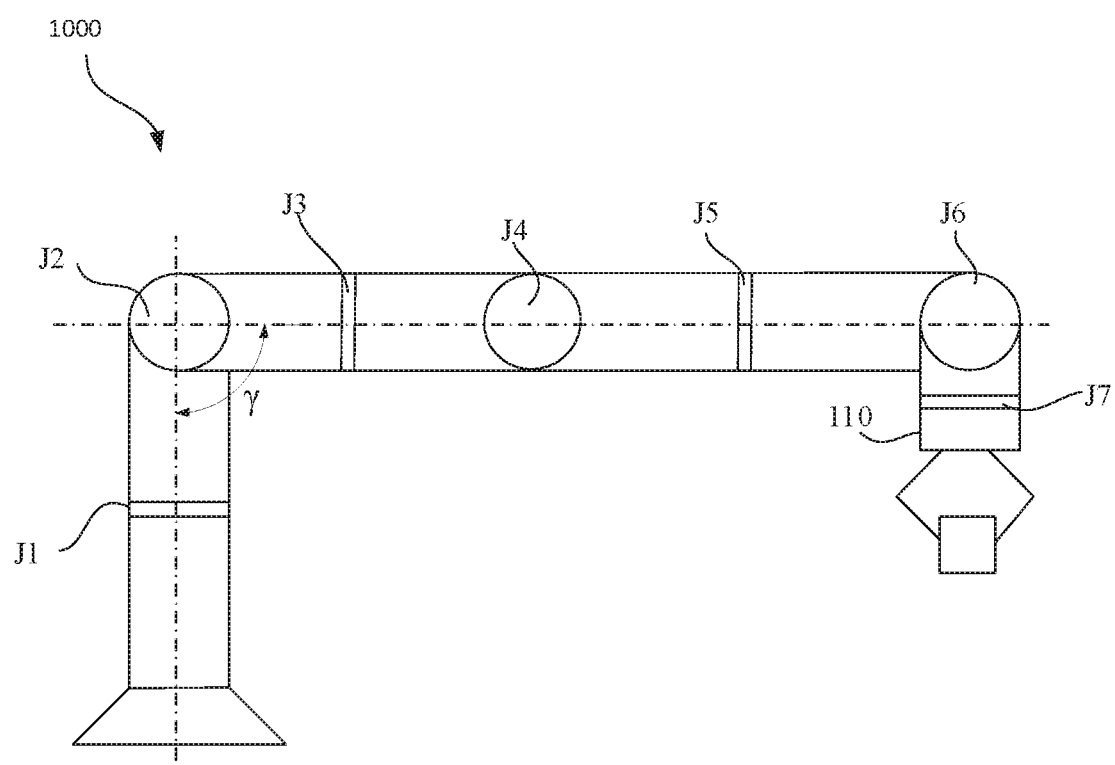
FIG. 10 illustrates an exemplary position of the robotic system of FIG. 1.

The simplified model 800 illustrated in FIG. 8 is similar to the simplified model 500 illustrated in FIG. 3. The difference is the existence of the displacement L2 (e.g., vertical to L1 and the rotation axis of J2) in the simplified model 800, which introduces an angular offset 13 between L1 and the line connecting the second joint J2 to the point mass m, as shown in the simplified model 900 of FIG. 9. A robotic system 100 shown in FIG. 10 illustrates an example configuration 1000 of the robotic system 100 that is consistent with the simplified models 800 and 900. In particular, the configuration 1000 of the robotic system 100 may have a large mass, for example an end effector 110, located at its distal end. Additionally, the links of the robotic system 100 connected between the second joint J2 and the end effector 110 may be aligned in substantially a same line in the configuration 1000.

With continuing reference to the example configuration 1000, the first joint J1 may be rotated while all the other joint positions are fixed (e.g., J2 angular position γ is fixed and equal to 90°). The torque applied on the first joint J1 can be recorded while the first joint J1 is rotated or shortly thereafter. After removing the torque due to friction and other factors, the sinusoidal portion of joint torque $\tau_1$ can be extracted, which can be determined according to Equation 12, reproduced below:

$$\tau_1 = A_1 \cdot \sin(q_1 + \varphi_1) \quad (12)$$

where $\tau_1$ corresponds to the torque applied on the first joint J1 caused by gravity;

$A_1$ is the first amplitude;

$q_1$ is a position of the first joint J1 during the rotation of the first joint J1; and $\varphi_1$ is the first phase shift.

Assuming the configuration as illustrated in FIG. 8, the first amplitude $A_1$, or the maximum gravity torque on J1 (e.g., with γ is equal to 90°) can be determined according to Equation 13, reproduced below:

$$A_1 = mgL_1 \sin\theta_2 \quad (13)$$

The first reference angle θ1 can be determined according to Equation 8, reproduced below:

$$\theta_1 = -\varphi_1 \text{ or } \theta_1 = 180° - \varphi_1 \quad (8)$$

The second joint J2 may then be rotated while all other joints, including the first joint J1, are locked (e.g., the joint J1 angular position is equal to θ1). The joint J2 may be rotated with constant velocity. The torque applied on the second joint J2 can be recorded while the joint J2 is rotated or shortly thereafter. After removing the torque due to friction and other factors, the sinusoidal portion of joint torque $\tau_2$ can be determined according to Equation 9, which is reproduced below:

$$\tau_2 = A_2 \sin(q_2 + \varphi_2) \quad (9)$$

where $\tau_2$ corresponds to the torque applied on the second joint J2 caused by gravity;

$A_2$ is the second amplitude;

$q_2$ is a position of the second joint J2 during the rotation of the second joint J2;

$\varphi_2$ is the second phase shift.

Assuming the configuration as shown in FIG. 8, the second amplitude $A_2$, or the maximum gravity torque on J2 (e.g., the joint J1 angular position is equal to θ1) can be determined according to Equation 14 below.

$$A_2 = mg\sqrt{L_1^2 + L_2^2} \quad (14)$$

The second phase shift $\varphi_2$ of the simplified models 800 and 900 is equal to $\theta_2+\beta$. Based on geometrical relationships from FIG. 9, β, $L_1$, $L_2$, $A_1$, $A_2$, and θ2 are related according to Equations 15 and 16 below.

$$\cos\beta = \frac{L_1}{\sqrt{L_1^2 + L_2^2}} \rightarrow \frac{A_1}{A_2} = \sin\theta_2 \cos\beta \quad (15), (16)$$

Based on the above equations and the product-to-sum identity, the second reference angle θ2 can be determined based on Equation 17 below.

$$\theta_2 = \frac{1}{2} \cdot \left[\varphi_2 + \arcsin\left(\sin\varphi_2 + 2 \cdot \frac{A_1}{A_2}\right)\right] \quad (17)$$

In this way, the first reference angle θ1 and the second reference angle θ2 are both acquired. The direction of gravity with respect to the robotic system can then be determined based on the first and second reference angles θ1 and θ2.

In the above-described example with reference to the configuration 1000, the angle γ is equal to 90° during the rotation of the first joint J1. In other examples, the angle γ may be equal to angles other than 90° during the rotation of the first joint J1. The first reference angle θ1 can be determined by using Equations 6, 7, and 8, reproduced below:

$$\tau_1 = A_1' \cdot \sin(q_1 + \varphi_1) \quad (6)$$

$$A_1' = mgL_1|\sin\gamma|\sin\theta_2 \rightarrow A_1 = \frac{A_1'}{|\sin\gamma|} \quad (7)$$

$$\theta_1 = -\varphi_1 \text{ or } \theta_1 = 180° - \varphi_1 \quad (8)$$

The second reference angle θ2 can be determined according to Equation 9 (reproduced below), Equation 18, and Equation 19 below.

$$\tau_2 = A_2 \sin(q_2 + \varphi_2) \quad (9)$$

$$A_2 = mg\sqrt{L_1^2 + L_2^2} \quad (18)$$

$$\theta_2 = \frac{1}{2} \cdot \left[\varphi_2 + \arcsin\left(\sin\varphi_2 + 2 \cdot \frac{A_1}{A_2}\right)\right] \quad (19)$$

In this way, the first reference angle θ1 and the second reference angle θ2 are both acquired. The direction of gravity with respect to the robotic system can then be determined based on the first and second reference angles θ1 and θ2.

Figure 11:
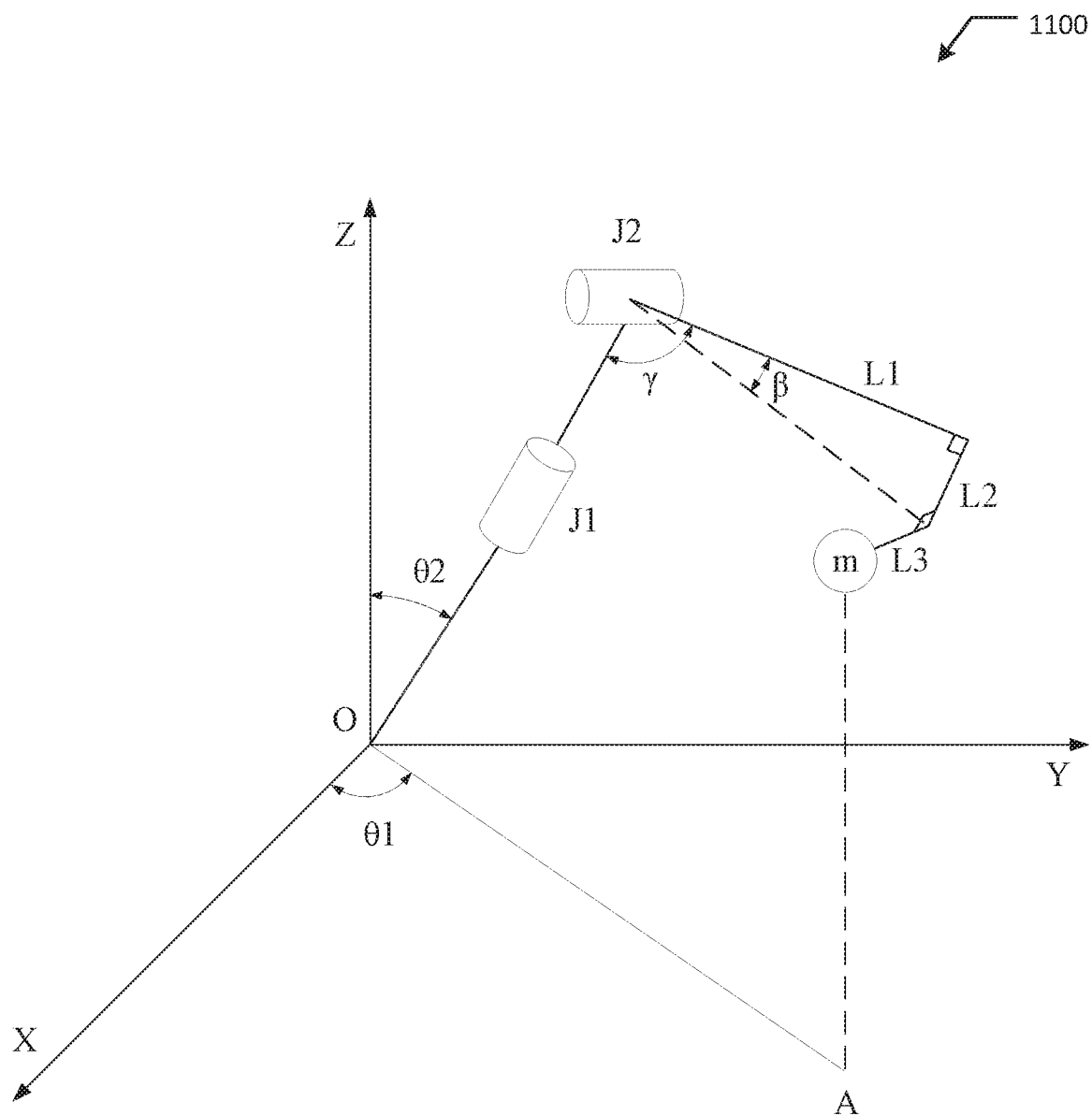
FIG. 11 illustrates a simplified model of a robotic system according to an embodiment of the present disclosure.

FIG. 11 illustrates a simplified model 1100 of a robotic system according to an embodiment of the present disclosure. The XYZ axes are the world coordinate system in Cartesian space, and gravity is in the negative Z direction. It is assumed that all robot mass can be lumped into a point mass m, so that all joints and links including J1 and J2 are massless.

The simplified model 1100 is similar to the simplified model 800 shown in FIG. 8. The difference is the existence of another offset L3 in the simplified model 1100, which is vertical to the plane determined by L1 and L2, as shown in FIG. 11. The simplified model 1100 represents a general situation where the robotic system can be of any arbitrary posture.

Assuming that γ is 90°, the first joint J1 may be rotated while all the other joint positions are fixed. The torque applied on the first joint J1 can be recorded while the joint J1 is rotated or shortly thereafter. After removing the torque due to friction and other factors, the sinusoidal portion of joint torque $\tau_1$ can be extracted according to Equation 20 below.

$$\tau_1 = mg\sqrt{L_1^2 + L_3^2} \cdot \sin\theta_2 \cdot \sin(q_1 + \varphi_1) \quad (20)$$

The first reference angle θ1 can be determined according to Equation 8, reproduced below.

$$\theta_1 = -\varphi_1 \text{ or } \theta_1 = 180° - \varphi_1 \quad (8)$$

The first joint J1 may then be fixed to the specific position $\theta_1$ such that the point mass m is located in the plane ZOA, as shown in FIG. 11. The second joint J2 may then be rotated while all the other joint positions are fixed. The torque applied on the second joint J2 can be recorded while the second joint J2 is rotated or shortly thereafter. After removing the torque due to friction and other factors, the sinusoidal portion of joint torque $\tau_2$ can be extracted according to Equations 9 and 18 reproduced below.

$$\tau_2 = A_2 \sin(q_2 + \varphi_2) \quad (9)$$

where $$A_2 = mg\sqrt{L_1^2 + L_2^2} \quad (18)$$

As discussed above in connection with the simplified models 800 and 900, $\varphi_2 = \theta_2 + \beta$, and $$\cos\beta = \frac{L_1}{\sqrt{L_1^2 + L_2^2}},$$

and thus $A_2$ can also be expressed as Equation 21 below.

$$A_2 = mgL_1 \frac{1}{\cos\beta} \quad (21)$$

When the joint J1's position $\theta_1 = -\varphi_1$ (or $180° - \varphi_1$) and the joint J2's position $\gamma = 90°$, the joint torque of J2 $\tau_2'$ can be determined according to Equation 22 below.

$$\tau_2' = mgL_1 \cos\theta_2 \quad (22)$$

The ratio between $\tau_2'$ and $A_2$ can be expressed as Equation 23 below.

$$\frac{\tau_2'}{A_2} = \cos\theta_2 \cos\beta \quad (23)$$

Based on the above equations and the product-to-sum identity, the second reference angle θ2 can be determined according to Equation 24 below.

$$\theta_2 = \frac{1}{2}\left[\varphi_2 + \arccos\left(2\frac{\tau_2'}{A_2} - \cos\varphi_2\right)\right] \quad (24)$$

In this way, the first reference angle θ1 and the second reference angle θ2 are both acquired. The direction of gravity with respect to the robotic system can then be determined based on the first and second reference angles θ1 and θ2.

The above-described method can be applied for various types of robots with at least two revolute rotation axes that are not parallel to each other. For example, in some embodiments, the robotic system may further include a mobile base with a rotary support for the robotic arm. In such embodiments, the rotary support may be taken as the first joint J1, and one of the joints of the robotic arm with a revolute axis not parallel to that of the rotary support may be taken as the second joint J2.

Those of ordinary skill in the art will appreciate that each of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

If a software function unit is realized and used as a product, it can be stored in a readable storage medium in a computer. Based on this understanding, the technical plan proposed by the present disclosure may be essentially or partially realized as a software product. In other cases, one or more parts of the above-described systems and methods that are beneficial to the conventional technology may be realized as the form of a software product. The software product may be stored in a storage medium, including one or more instructions for a computational device (such as a processor, a personal computer, a server, or a network device) to perform all or some of the steps disclosed by the embodiments of the present disclosure. The storage medium may include one or more media capable of storing program codes, such as one or more of a USB disk, a mobile hard disk, a read-only memory (ROM), a random-access memory (RAM), and a floppy disk.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims. In other respects, the discussed or depicted coupling (e.g., direct coupling or communicative coupling) between components may be via one or more wired or wireless interfaces (e.g., electrical and/or mechanical interfaces).

What is claimed is:

1. A method for estimating a direction of gravity with respect to a robot, the robot comprising a plurality of joints and a plurality of links successively connected by the plurality of joints, the plurality of joints comprising a first joint and a second joint, the first joint being closer to a proximal end of the robot than the second joint, wherein the method comprises:
rotating the first joint;
recording a first torque information of the first joint due to rotation of the first joint;
rotating the second joint;
recording a second torque information of the second joint due to rotation of the second joint; and
estimating the direction of gravity with respect to the robot based on the first torque information and the second torque information.

2. The method of claim 1, wherein the first torque information includes a first amplitude and a first phase shift of a torque applied on the first joint, and
wherein the second torque information includes a second amplitude and a second phase shift of a torque applied on the second joint.

3. The method of claim 2, wherein estimating the direction of gravity with respect to the robot based on the first torque information and the second torque information comprises:
determining a first reference angle based on the first phase shift, wherein the first reference angle corresponds to a position of the first joint at which a torque applied on the first joint caused by gravity is substantially zero;
determining a second reference angle based on the first torque information and the second torque information, wherein the second reference angle is an angle between the direction of gravity and a rotation axis of the first joint; and
estimating the direction of gravity with respect to the rotation axis of the first joint based on the first reference angle and the second reference angle.

4. The method of claim 3, wherein prior to rotating the second joint, the method further comprises:
rotating the first joint to the position of the first joint at which a torque applied on the first joint caused by gravity is substantially zero.

5. The method of claim 4, wherein, prior to rotating the first joint, the method further comprises:
aligning the plurality of links connected after the second joint in substantially the same line and substantially perpendicular to one of the plurality of links between the first joint and the second joint.

6. The method of claim 5, wherein determining the first reference angle based on the first phase shift includes determining the first reference angle according to the following equations:

$$\tau_1 = A_1 \sin(q_1 + \varphi_1)$$

$$\theta_1 = -\varphi_1 \text{ or } \theta_1 = 180° - \varphi_1$$

wherein
$\tau_1$ is a sinusoidal portion of a torque applied on the first joint during rotation of the first joint, and corresponds to the torque applied on the first joint caused by gravity;
$A_1$ is the first amplitude;
$q_1$ is a position of the first joint during rotation of the first joint;
$\varphi_1$ is the first phase shift; and
$\theta_1$ is the first reference angle.

7. The method of claim 6, wherein determining the second reference angle based on the first torque information and the second torque information includes determining the second reference angle based on the following equations:

$$\tau_2 = A_2 \sin(q_2 + \varphi_2)$$

$$\theta_2 = \arcsin\left(\frac{A_1}{A_2}\right)$$

wherein
$\tau_2$ is a sinusoidal portion of a torque applied on the second joint during rotation of the second joint, and corresponds to a torque applied on the second joint caused by gravity;
$A_2$ is the second amplitude;
$q_2$ is a position of the second joint during rotation of the first joint;
$\varphi_2$ is the second phase shift; and
$\theta_2$ is the second reference angle.

8. The method of claim 6, wherein the robot further comprises an end effector connected to a distal joint of the plurality of joints, and wherein determining the second reference angle based on the first torque information and the second torque information includes determining the second reference angle based on the following equations:

$$\tau_2 = A_2 \sin(q_2 + \varphi_2)$$

$$\theta_2 = \frac{1}{2} \cdot \left[\varphi_2 + \arcsin\left(\sin\varphi_2 + 2 \cdot \frac{A_1}{A_2}\right)\right]$$

wherein
$\tau_2$ is a sinusoidal portion of a torque applied on the second joint during rotation of the second joint, and corresponds to a torque applied on the second joint caused by gravity;
$A_2$ is the second amplitude;
$q_2$ is a position of the second joint during rotation of the first joint;
$\varphi_2$ is the second phase shift; and
$\theta_2$ is the second reference angle.

9. The method of claim 1, wherein the first joint is located at a proximal end of the robot, and the second joint is an adjacent joint connected to the first joint via one of the plurality of links.

10. The method of claim 2, wherein rotating the first joint includes rotating the first joint forward and backward to cover a first predetermined range at a substantially constant speed, and
wherein rotating the second joint includes rotating the second joint forward and backward to cover a second predetermined range at a substantially constant speed.

11. A robotic system comprising:
a plurality of joints successively connecting a plurality of links, the plurality of joints including a first joint and a second joint, the first joint being closer to a proximal end of the robotic system than the second joint;
a processor; and
a memory storing instructions which, when executed by the processor, cause the processor to:
rotate the first joint;
record a first torque information of the first joint due to rotation of the first joint;
rotate the second joint;
record a second torque information of the second joint due to rotation of the second joint; and
estimate a direction of gravity with respect to the robotic system based on the first torque information and the second torque information.

12. The robotic system of claim 11, wherein the first torque information includes a first amplitude and a first phase shift of a torque applied on the first joint, and
wherein the second torque information comprises a second amplitude and a second phase shift of a torque applied on the second joint.

13. The robotic system of claim 12, wherein the estimating the direction of gravity with respect to the robot based on the first torque information and the second torque information comprises:
determining a first reference angle based on the first phase shift, wherein the first reference angle corresponds to a position of the first joint at which a torque applied on the first joint caused by gravity is substantially zero;
determining a second reference angle based on the first torque information and the second torque information, wherein the second reference angle is an angle between the direction of gravity and a rotation axis of the first joint; and
estimating the direction of gravity with respect to the rotation axis of the first joint based on the first reference angle and the second reference angle.

14. The robotic system of claim 13, wherein the instructions, when executed by the processor prior to rotating the second joint, further cause the processor to rotate the first joint to the position of the first joint at which a torque applied on the first joint caused by gravity is substantially zero.

15. The robotic system of claim 14, wherein the instructions, when executed by the processor prior to rotating the first joint, cause the processor to align the plurality of links connected after the second joint in substantially the same line and substantially perpendicular to one of the plurality of links between the first joint and the second joint.

16. The robotic system of claim 15, wherein the instructions, when executed by the processor, cause the processor to determine the first reference angle according to the following equations:

$$\tau_1 = A_1 \sin(q_1+\varphi_1)$$

$$\theta_1 = -\varphi_1 \text{ or } \theta_1 = 180° - \varphi_1$$

wherein $\tau_1$ is a sinusoidal portion of a torque applied on the first joint during rotation of the first joint, and corresponds to the torque applied on the first joint caused by gravity;

$A_1$ is the first amplitude;

$q_1$ is a position of the first joint during rotation of the first joint;

$\varphi_1$ is the first phase shift; and $\theta_1$ is the first reference angle.

17. The robotic system of claim 16, wherein the instructions, when executed by the processor, cause the processor to determine the second reference angle based on the following equations:

$$\tau_2 = A_2 \sin(q_2 + \varphi_2)$$

$$\theta_2 = \arcsin\left(\frac{A_1}{A_2}\right)$$

wherein $\tau_2$ is a sinusoidal portion of a torque applied on the second joint during rotation of the second joint, and corresponds to a torque applied on the second joint caused by gravity;

$A_2$ is the second amplitude;

$q_2$ is a position of the second joint during rotation of the first joint;

$\varphi_2$ is the second phase shift; and $\theta_2$ is the second reference angle.

18. The robotic system of claim 16, further comprising an end effector connected to a distal joint of the plurality of joints, and wherein the instructions, when executed by the processor, cause the processor to determine the second reference angle based on the following equations:

$$\tau_2 = A_2 \sin(q_2 + \varphi_2)$$

$$\theta_2 = \frac{1}{2} \cdot \left[\varphi_2 + \arcsin\left(\sin\varphi_2 + 2 \cdot \frac{A_1}{A_2}\right)\right]$$

wherein $\tau_2$ is a sinusoidal portion of a torque applied on the second joint during rotation of the second joint, and corresponds to a torque applied on the second joint caused by gravity;

$A_2$ is the second amplitude;

$q_2$ is a position of the second joint during rotation of the first joint;

$\varphi_2$ is the second phase shift; and $\theta_2$ is the second reference angle.

19. A non-transitory, computer-readable medium storing instructions which, when executed by a processor, cause the processor to:

rotate a first joint of a robotic system, the robotic system including a plurality of joints and a plurality of links successively connected by the plurality of joints, wherein the plurality of joints include a first joint and a second joint, and wherein the first joint is closer to a proximal end of the robotic system than the second joint;

record a first torque information of the first joint due to rotation of the first joint;

rotate the second joint;

record a second torque information of the second joint due to rotation of the second joint; and estimate a direction of gravity with respect to the robotic system based on the first torque information and the second torque information.

20. The non-transitory, computer-readable medium of claim 19, wherein the first torque information includes a first amplitude and a first phase shift of a torque applied on the first joint, the second torque information includes a second amplitude and a second phase shift of a torque applied on the second joint, and wherein the instructions cause the processor to:

determine a first reference angle based on the first phase shift, wherein the first reference angle corresponds to a position of the first joint at which a torque applied on the first joint caused by gravity is substantially zero;

determine a second reference angle based on the first torque information and the second torque information, wherein the second reference angle is an angle between the direction of gravity and a rotation axis of the first joint; and estimate the direction of gravity with respect to the rotation axis of the first joint based on the first reference angle and the second reference angle.

* * * * *